(12) United States Patent
Elie et al.

(10) Patent No.: US 10,787,847 B2
(45) Date of Patent: Sep. 29, 2020

(54) HINGE ASSEMBLY AND METHOD OF ASSEMBLING AN ACTUATOR TO A HINGE ASSEMBLY

(71) Applicant: FORD GLOBAL TECHNOLOGIES, LLC, Dearborn, MI (US)

(72) Inventors: Larry Dean Elie, Ypsilanti, MI (US); Gerald J. Heath, Allen Park, MI (US); John Wayne Jaranson, Dearborn, MI (US); Michael Musa Azzouz, Dearborn Heights, MI (US); Jeff Wallace, Walled Lake, MI (US); Robert F. Novak, Farmington Hills, MI (US); Timothy J. Potter, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 16/134,007

(22) Filed: Sep. 18, 2018

(65) Prior Publication Data
US 2020/0087960 A1    Mar. 19, 2020

(51) Int. Cl.
*B60J 5/04* (2006.01)
*E05D 7/04* (2006.01)
*E05F 15/622* (2015.01)

(52) U.S. Cl.
CPC .......... *E05D 7/0415* (2013.01); *B60J 5/0468* (2013.01); *B60J 5/0473* (2013.01); *E05F 15/622* (2015.01); *E05Y 2600/51* (2013.01); *E05Y 2600/626* (2013.01); *E05Y 2900/532* (2013.01)

(58) Field of Classification Search
CPC .......... B60J 5/04; B60J 5/0468; E05F 15/614; E05F 15/622; E05Y 2900/531; E05D 7/0415

USPC .......................................... 296/146.4, 146.11
See application file for complete search history.

(56) References Cited

U.S. PATENT DOCUMENTS

| 4,860,424 A | 8/1989 | Kaibuki et al. |
| 5,950,295 A * | 9/1999 | Worden ................. B62D 65/06 118/500 |
| 7,540,554 B2 | 6/2009 | Bals |
| 9,353,566 B2 | 5/2016 | Miu et al. |

(Continued)

FOREIGN PATENT DOCUMENTS

| DE | 102008010836 A1 | 9/2008 | |
| DE | 102013210824 A1 | 12/2014 | |
| FR | 2910044 * | 6/2008 | ................ B60J 5/04 |

OTHER PUBLICATIONS

English Machine Translation of DE102008010836 dated Sep. 25, 2008.

(Continued)

*Primary Examiner* — Gregory A Blankenship
(74) *Attorney, Agent, or Firm* — David Coppiellie; King & Schickli, PLLC

(57) ABSTRACT

A hinge assembly for mounting a door to a frame of a motor vehicle includes (a) a hinge bracket, having a first receiver and a second receiver, (b) a hinge pin pivotally connecting the door to the hinge bracket at the first receiver, (c) an actuator, having an output shaft, (d) a retention feature, connecting the output shaft to the hinge bracket at the second receiver, and (e) an actuator mounting feature securing the actuator to the door. A method of assembling an actuator in a hinge assembly that mounts a door to a frame of a motor vehicle is also provided.

16 Claims, 13 Drawing Sheets

(56) References Cited

U.S. PATENT DOCUMENTS

| | | | |
|---|---|---|---|
| 9,676,256 B2* | 6/2017 | Elie | B60J 5/00 |
| 2016/0010379 A1* | 1/2016 | Sauerwein | E05F 5/00 |
| | | | 701/49 |
| 2017/0074020 A1* | 3/2017 | Azzouz | E05F 15/611 |
| 2018/0080270 A1* | 3/2018 | Khan | E05F 15/42 |
| 2018/0328097 A1* | 11/2018 | Holt | E05F 15/611 |
| 2019/0106917 A1* | 4/2019 | Patterson | E05C 17/206 |

OTHER PUBLICATIONS

English Machine Translation of DE102013210824A1 dated Dec. 11, 2014.

* cited by examiner

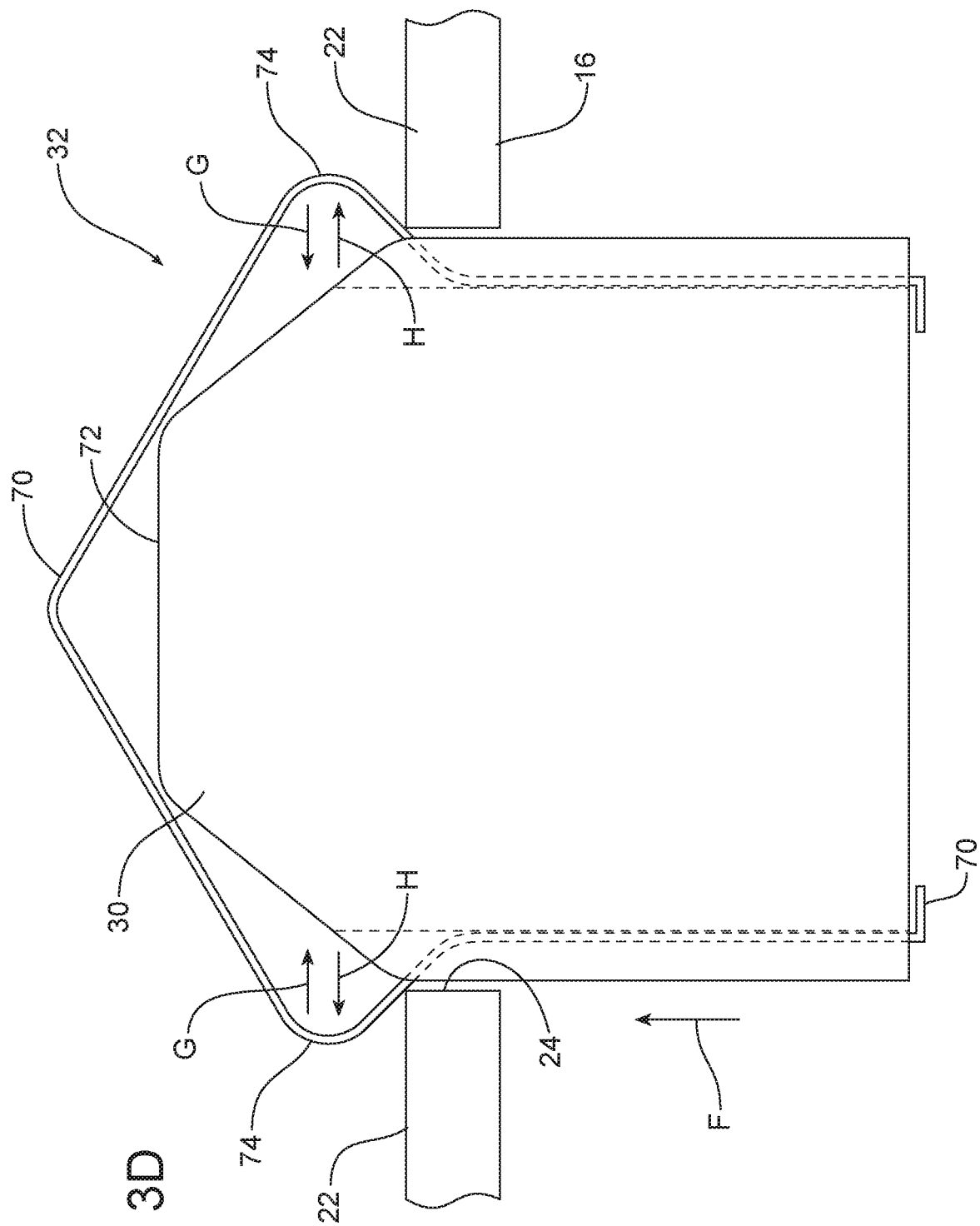

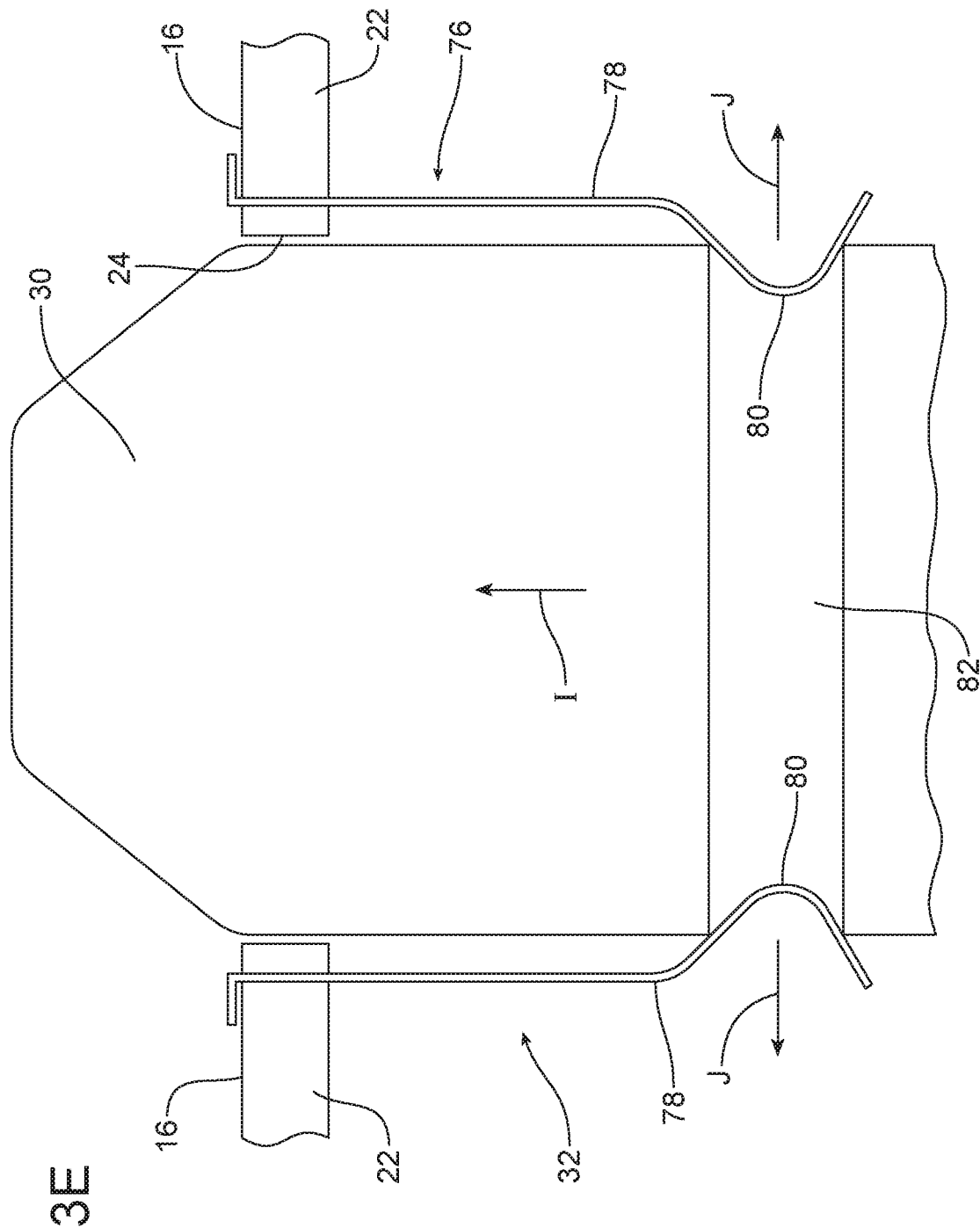

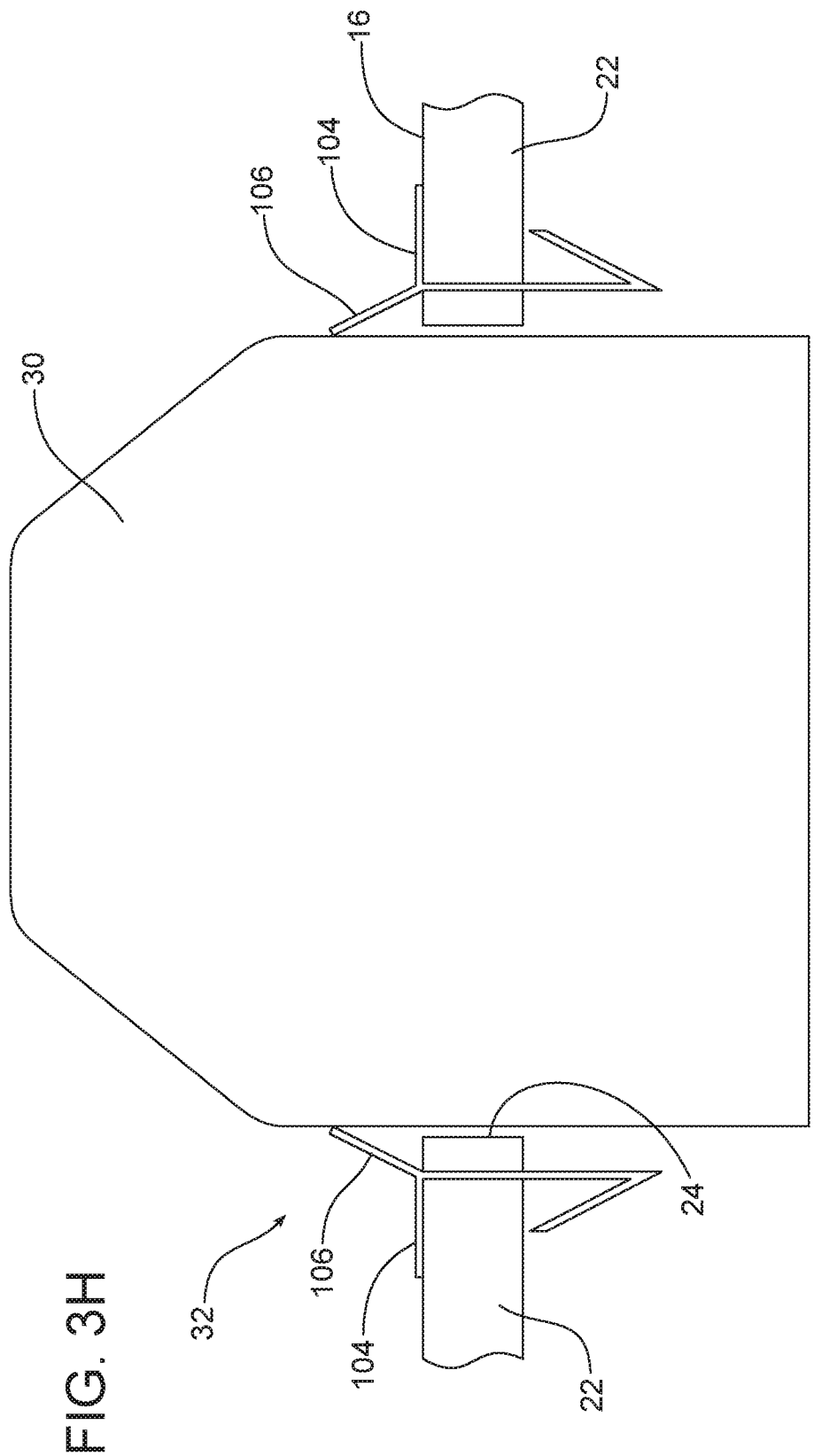

HINGE ASSEMBLY AND METHOD OF ASSEMBLING AN ACTUATOR TO A HINGE ASSEMBLY

TECHNICAL FIELD

This document relates generally to the motor vehicle equipment field and, more particularly, to a new and improved hinge assembly as well as to a related method of assembling an actuator to a hinge assembly that mounts a door to a frame of a motor vehicle.

BACKGROUND

The limited angle to which a motor vehicle door may be opened allows only limited access to the hinge assembly for the mounting of a powered actuator of a type adapted to (a) assist in the opening of the door or (b) actually provide for the opening and closing of the door.

This document relates to a new and improved hinge assembly of inexpensive, efficient and effective design that greatly simplifies aligning and mounting of a door actuator to an already-hung door of a motor vehicle.

SUMMARY

In accordance with the purposes and benefits as described herein, a new and improved hinge assembly is provided for mounting a door to a frame of a motor vehicle. That hinge assembly comprises: (a) a hinge bracket including a first receiver and a second receiver, (b) a hinge pin pivotally connecting the door to the hinge bracket at the first receiver, (c) an actuator having an output shaft, (d) a retention feature resiliently connecting the output shaft to the hinge bracket at the second receiver and (e) an actuator mounting feature securing the actuator to the door.

The first receiver and the second receiver may be axially aligned. Further, the actuator may include a motor and offset drive feature between the motor and the output shaft whereby the motor may be offset from the output shaft and, therefore, from the hinge pin and the pivot axis of the door. The hinge bracket may include a first leaf carrying the first receiver and a second leaf carrying the second receiver. Further, the hinge bracket may be fixed to the frame of the motor vehicle.

Still further, the actuator mounting feature may include a door bracket fixed to the door, and an adaptor plate fixed to the actuator and a fastener securing the adapter plate to the door bracket.

The retention feature may include a double spring-ball carried on one of the output shaft and the hinge bracket. In another possible embodiment, the retention feature may comprise a single spring ball carried on one of the output shaft and the hinge bracket. In yet another possible embodiment, the retention feature may comprise a double spring carried on the output shaft. In yet another possible embodiment, the retention feature may comprise a double spring carried on the hinge bracket and a spring receiver carried on the output shaft. In still another possible embodiment, the retention feature may comprise a single spring carried on the hinge bracket and a cooperating spring receiver carried on the output shaft. In yet another possible embodiment, the retention feature may comprise a spring-loaded dog ear carried on the output shaft. In still another possible embodiment, the retention feature may comprise a spring clip retainer carried on the hinge bracket.

In any of the possible embodiments, the second receiver may be acircular in cross-section so that the output shaft of the actuator is keyed to the hinge bracket that is fixed to the frame of the motor vehicle.

In accordance with an additional aspect, a new and improved method is provided of assembling an actuator to a hinge assembly that mounts a door to a frame of a motor vehicle. That method may be broadly described as comprising the steps of: (a) inserting an output shaft of the actuator into a receiver of a hinge bracket, (b) retaining, by a retention feature, the output shaft in the receiver and (c) connecting, by an actuator mounting feature, the actuator to the door.

The method may further include the step of holding the actuator in a single hand during the inserting of the output shaft of the actuator into the receiver of the hinge bracket. Still further, the method may include the step of holding, by the resilient retention feature, a first mounting actuator in a door bracket in alignment with a second mounting aperture in an adapter plate carried on the actuator.

Still further, the method may include driving, by a drive tool, a fastener into the first mounting aperture and the second mounting aperture whereby the actuator is mounted to the door. Still further, the method may include the step of keying the output shaft to the hinge bracket by aligning an acircular cross-section of the output shaft with a mating acircular opening of the receiver.

In the following description, there are shown and described several preferred embodiments of the hinge assembly and the related method of assembling an actuator to a hinge assembly that mounts a door to a frame of a motor vehicle. As it should be realized, the hinge assembly and the related method are capable of other, different embodiments and their several details are capable of modification in various, obvious aspects all without departing from hinge assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hinge assembly and related method and together with the description serve to explain certain principles thereof.

FIGS. 3A-3H are schematic illustrations of eight different embodiments of the retention feature that resiliently connects the output shaft of the actuator to the hinge bracket at the second receiver.

FIG. 3A illustrates a double spring-ball retention feature.

Figure 3A:
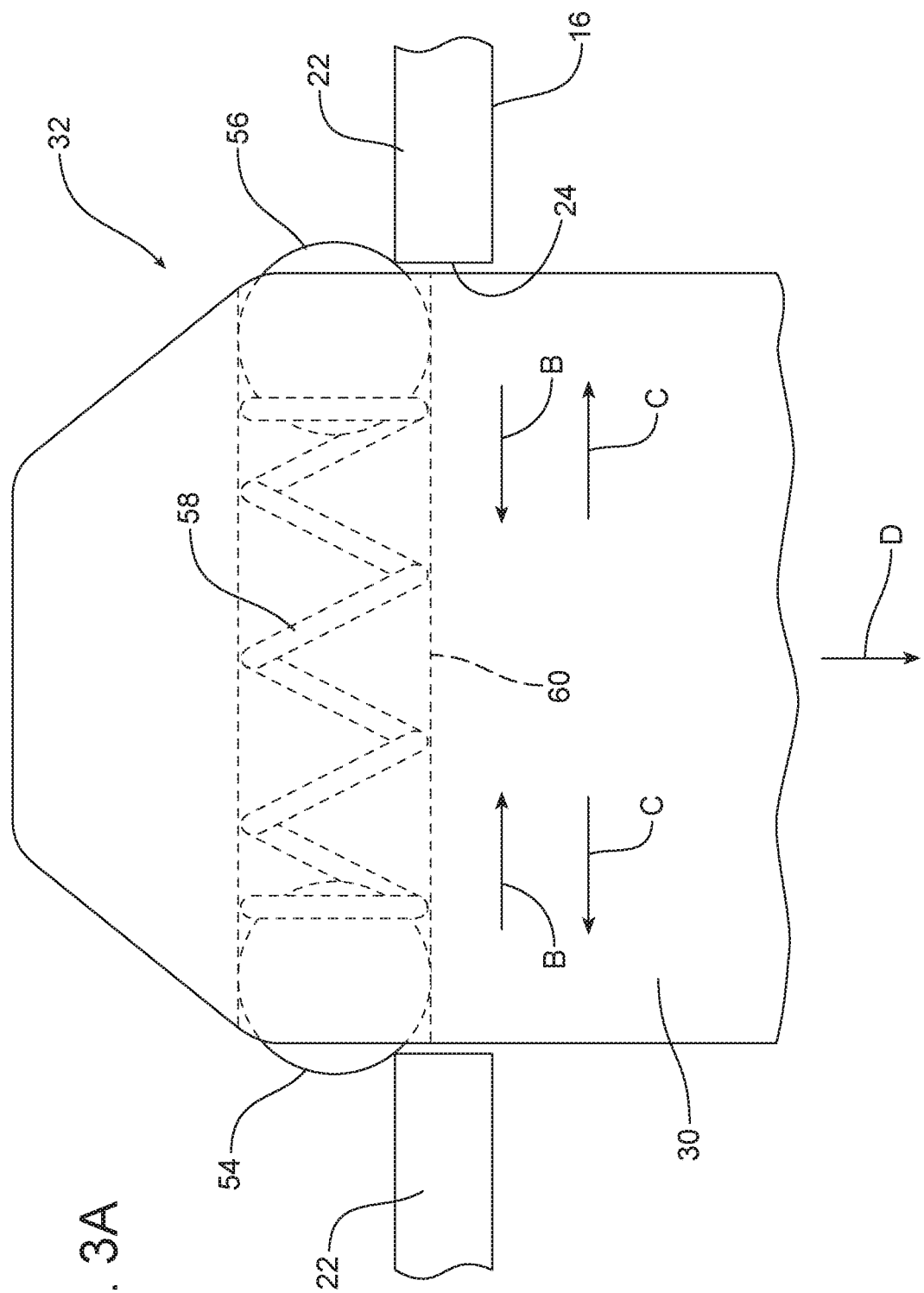
Figure 3B:
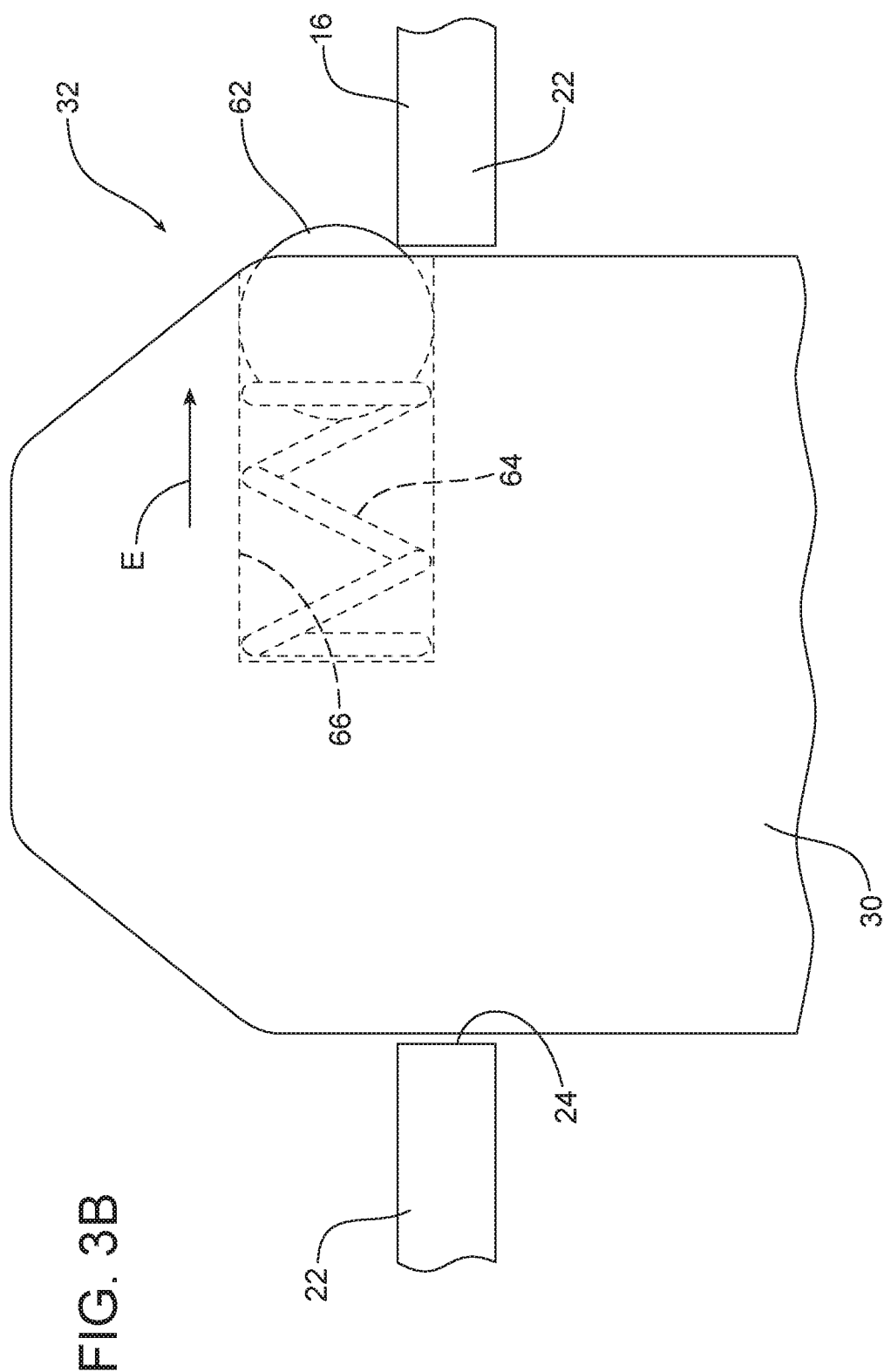

FIG. 3B schematically illustrates a single spring-ball retention feature.

Figure 3C:
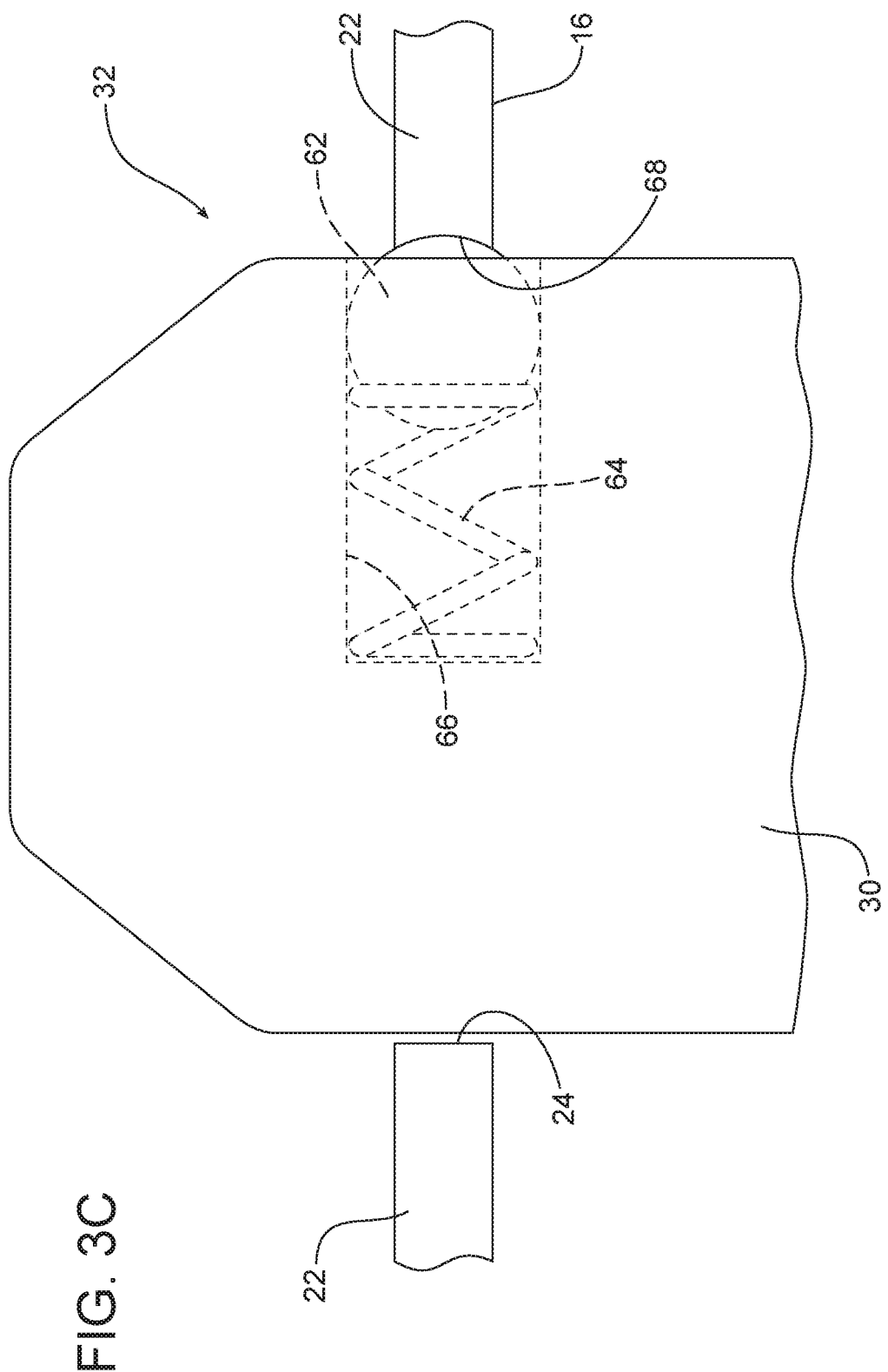

FIG. 3C illustrates a single spring-ball retention feature on the output shaft that engages in a detent in the hinge bracket.

FIG. 3D illustrates a double spring-ball retention feature above a square receiver opening in the hinge bracket.

FIG. 3E illustrates a double-spring retention feature carried on the hinge bracket and engaging a retention feature receiver on the output shaft.

Figure 3F:
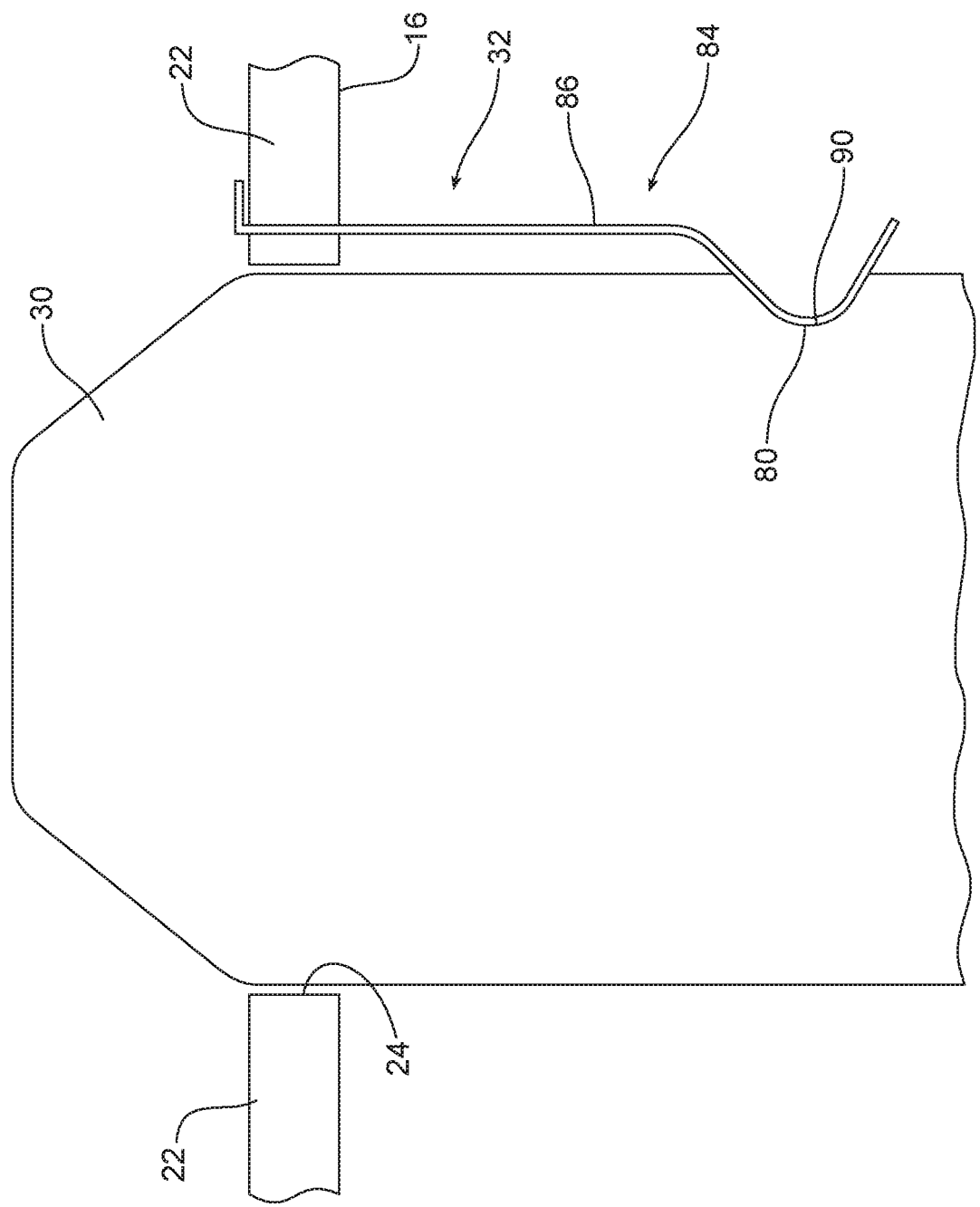

FIG. 3F schematically illustrates a single spring retention feature carried on the hinge bracket engaging a retention feature receiver on the output shaft.

Figure 3G:
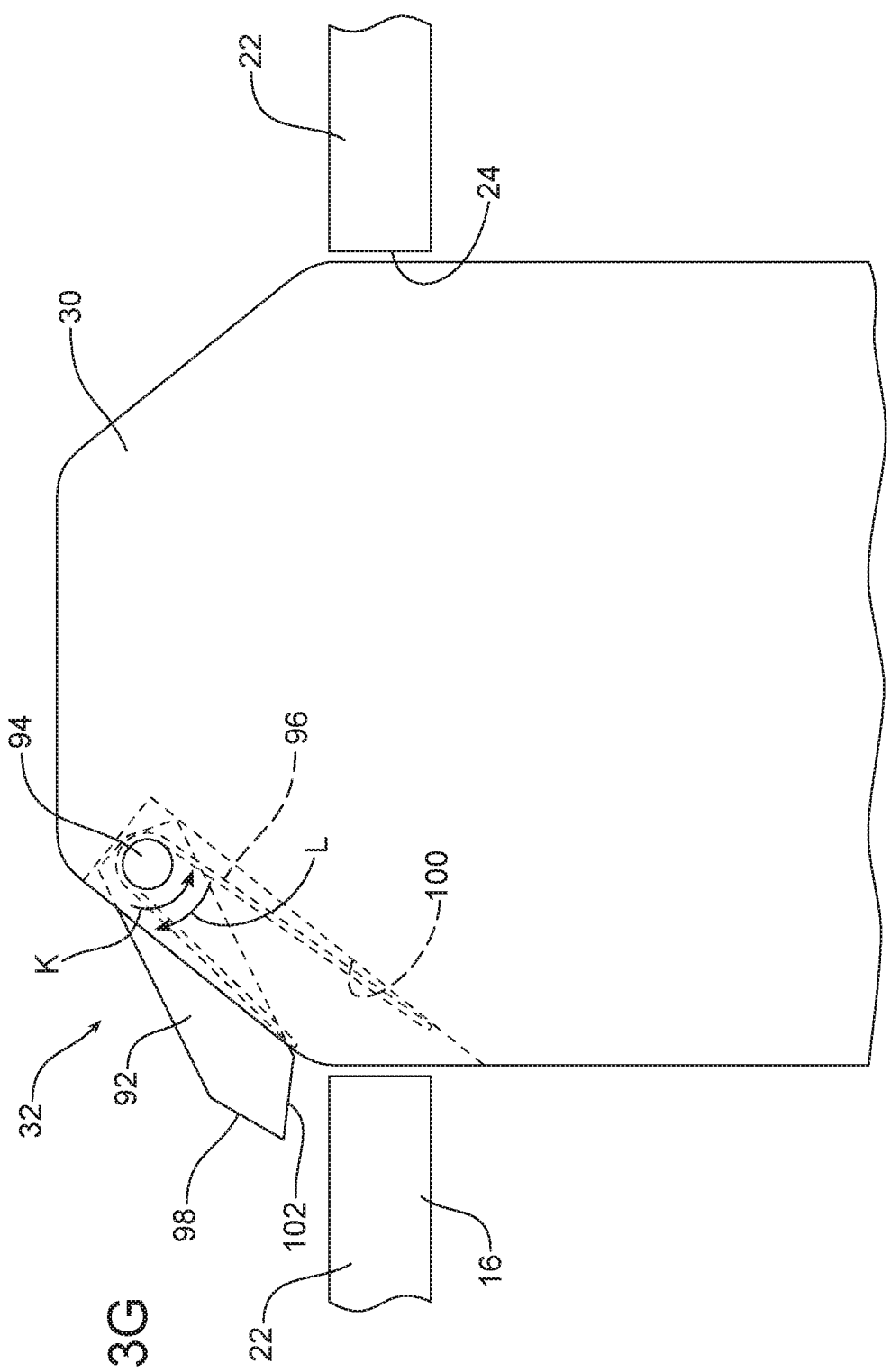

FIG. 3G schematically illustrates a single dog ear retention feature on the output shaft engaging above a square receiver opening in the hinge bracket.

FIG. 3H illustrates a spring clip retainer retention feature carried on the hinge bracket and positively squeezing and holding the output shaft of the actuator.

Figure 4A:
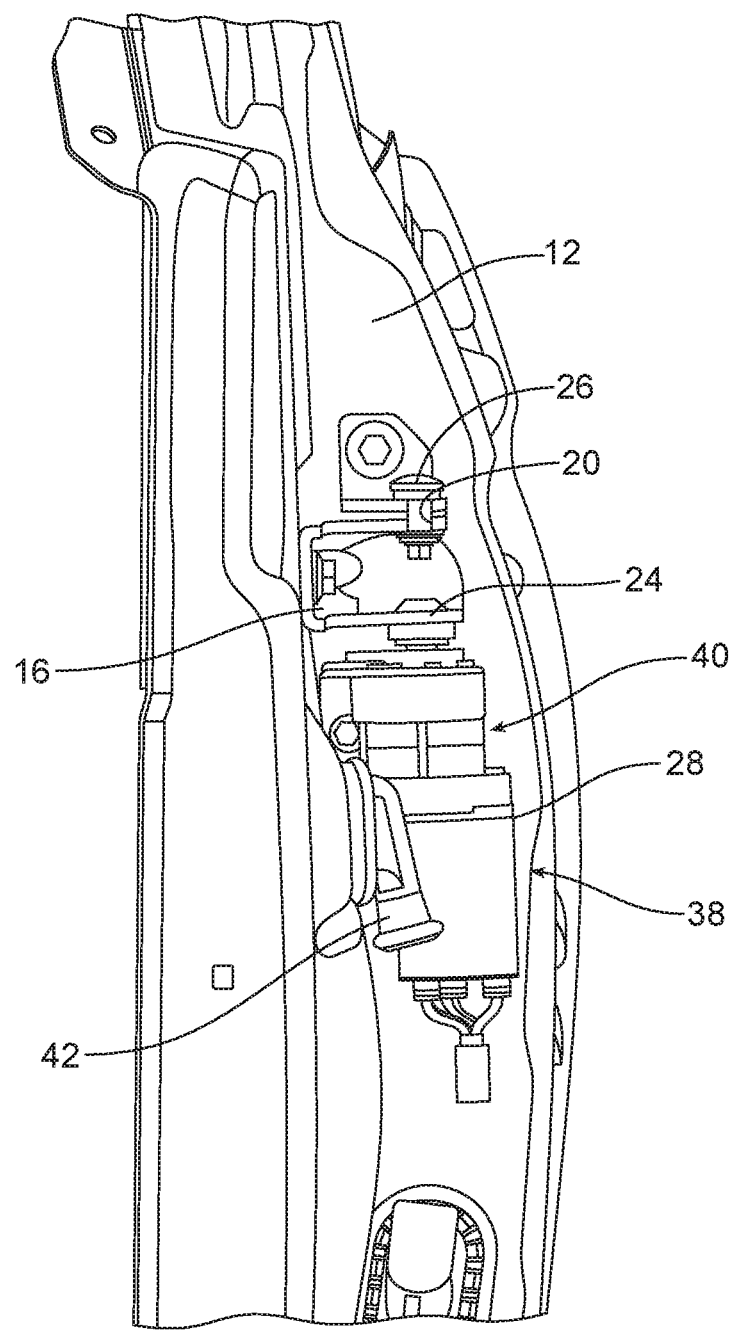

FIG. 4A is an elevational view of an alternative embodiment of the hinge assembly wherein the actuator includes an offset drive feature to provide space in the hinge area accommodating a wiring harness.

Figure 4B:
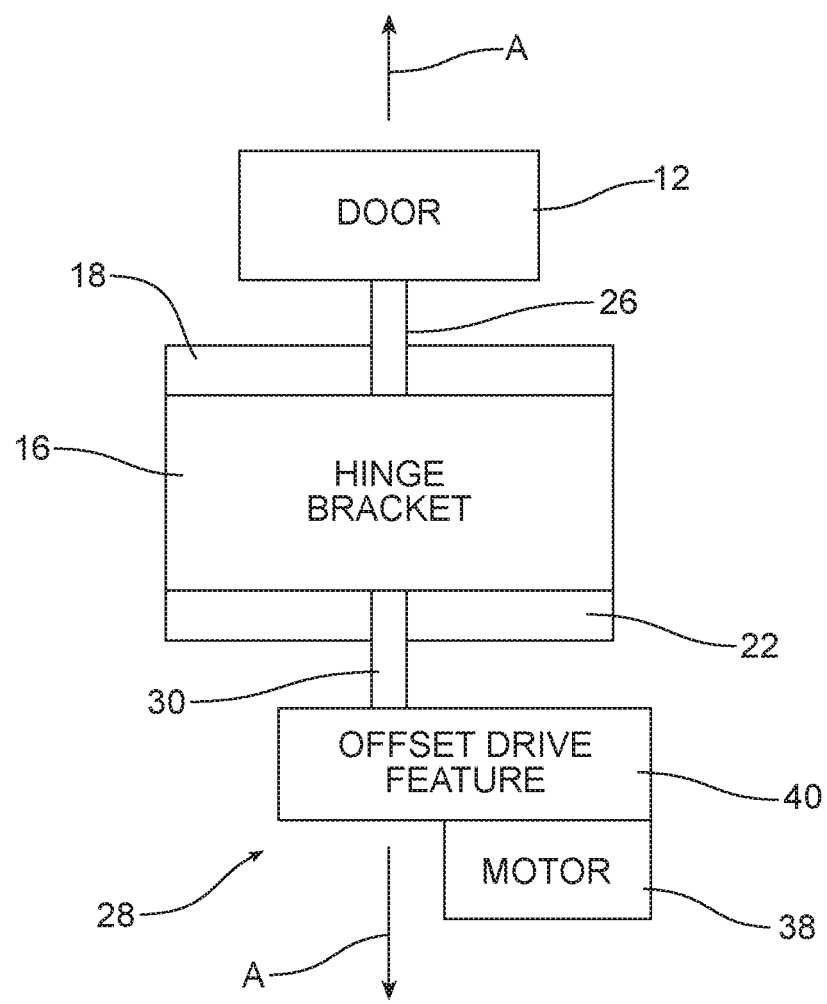

FIG. 4B is a schematic block diagram of the alternative embodiment illustrated in FIG. 4A.

Figure 5:
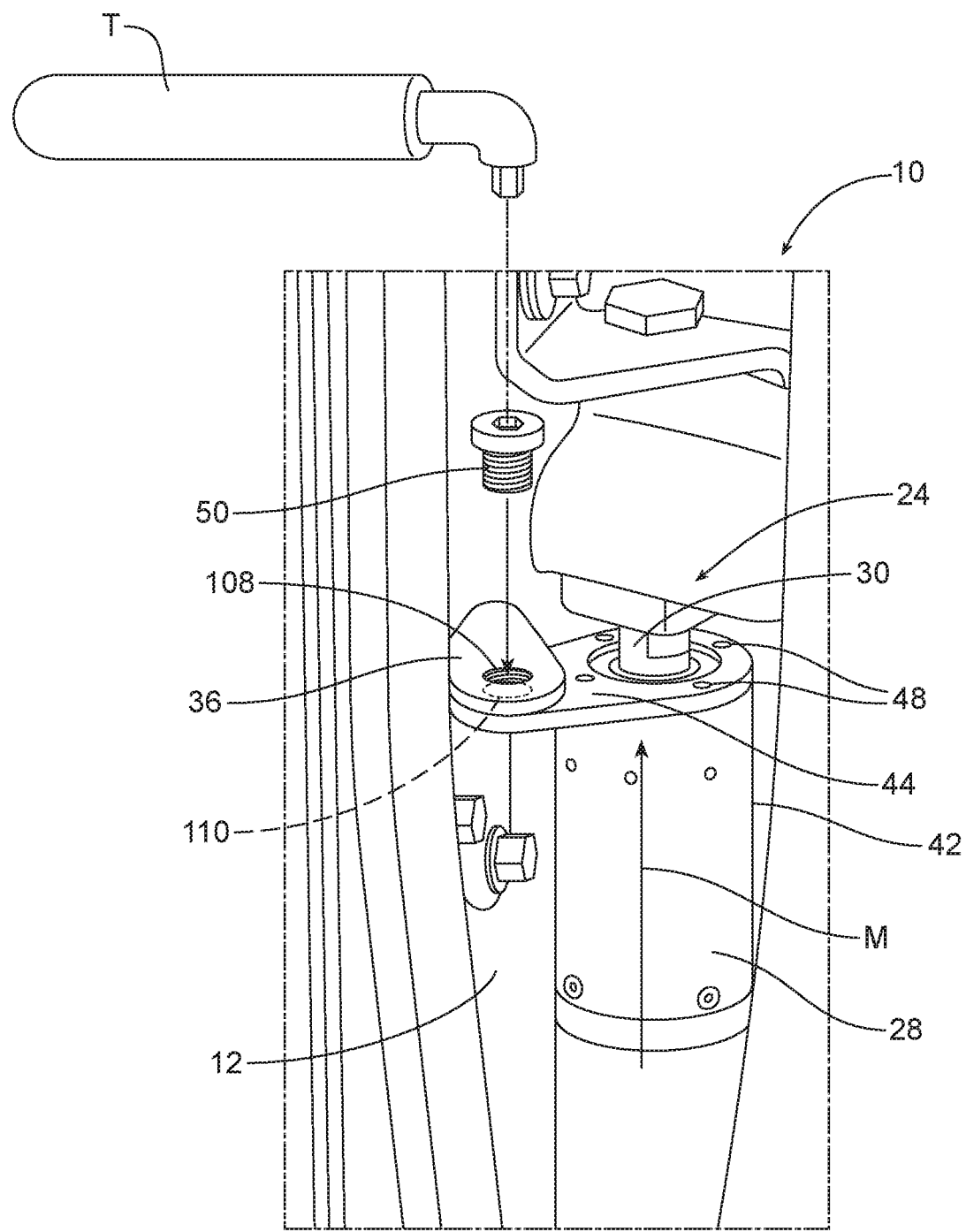

FIG. 5 is a perspective view of the hinge assembly to aid in illustrating the method of assembling an actuator to a hinge assembly that mounts a door to a frame of the motor vehicle.

Reference will now be made in detail to the present preferred embodiments of the hinge assembly and related method, examples of which are illustrated in the accompanying drawing figures.

DETAILED DESCRIPTION

Figure 1:
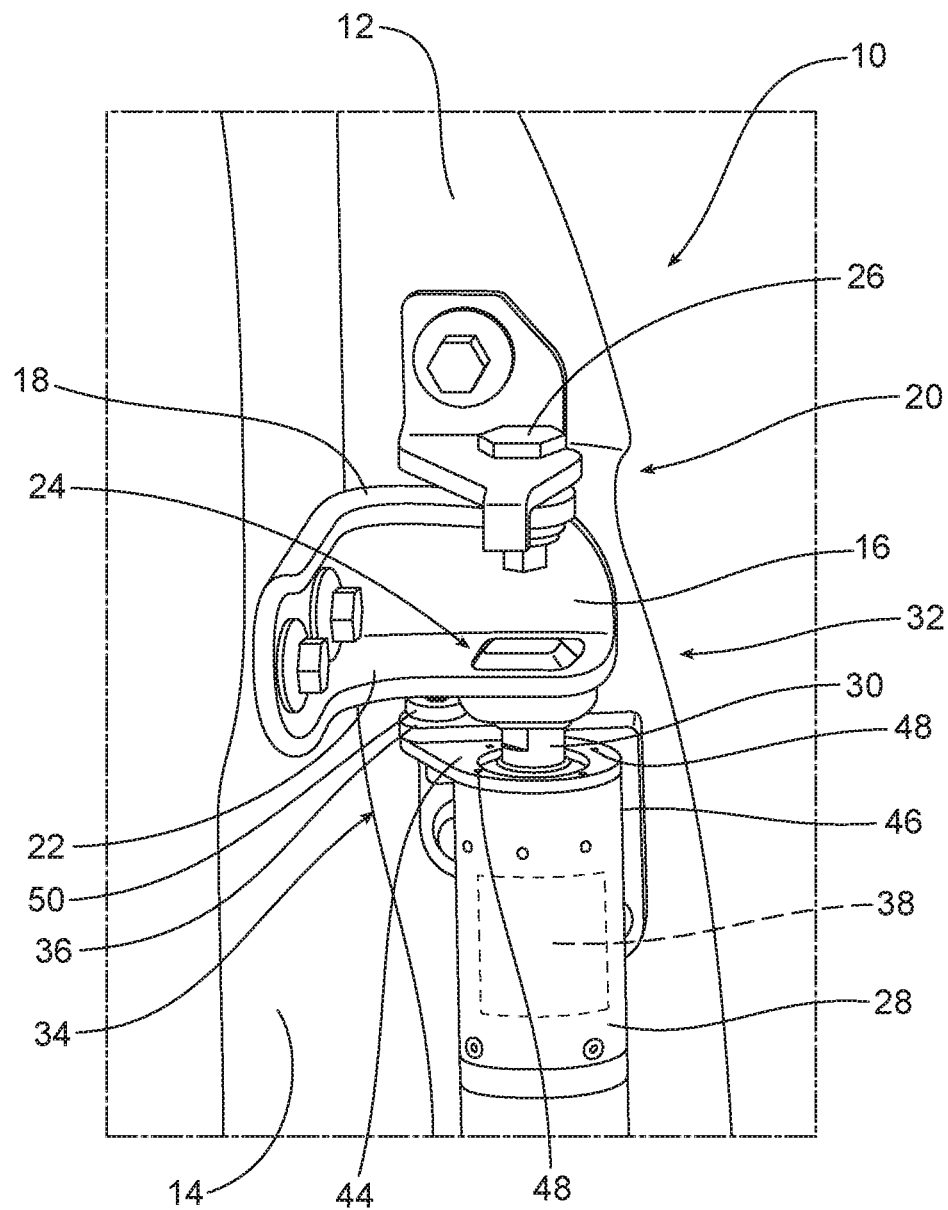
FIG. 1 is a detailed perspective view of the hinge assembly including the hinge bracket fixed to the frame of the motor vehicle, the door bracket fixed to the door and the actuator cantilevered to the door bracket and having an output shaft keyed to the hinge bracket.
Figure 2:
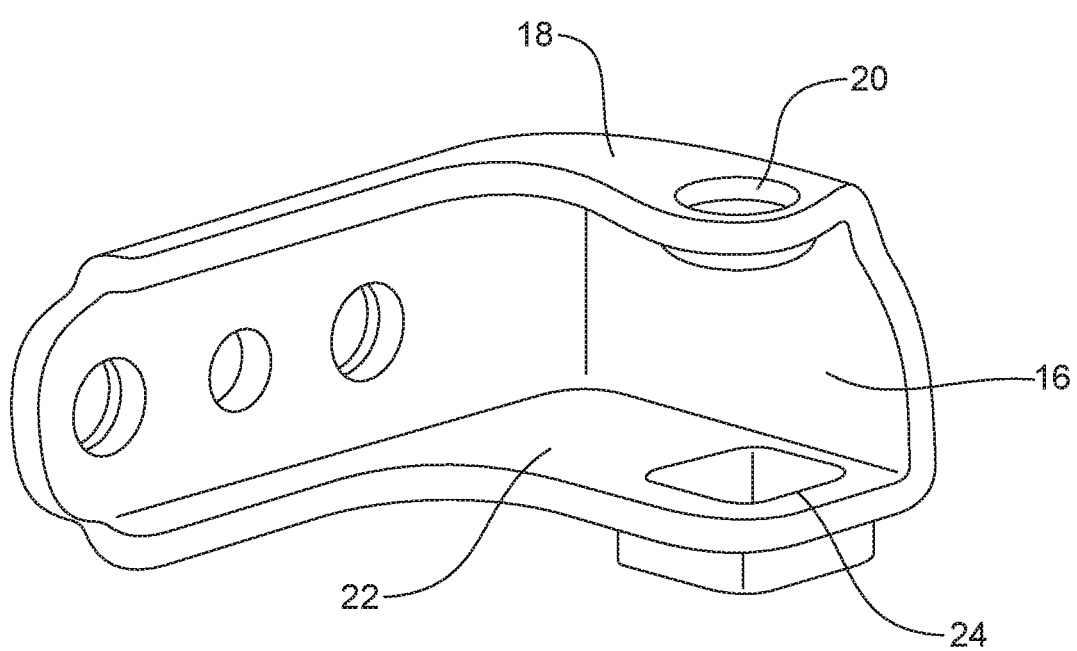
FIG. 2 is a detailed perspective view of the hinge bracket including the first leaf carrying the first receiver and the second leaf carrying the second receiver.

Reference is now made to FIG. 1 illustrating the new and improved hinge assembly 10 adapted for mounting a door 12 to a frame 14 of a motor vehicle. As illustrated in FIG. 1, the hinge assembly 10 includes a hinge bracket 16 fixed to the frame 14. As illustrated in detail in FIG. 2, the hinge bracket 16 includes a first leaf 18 carrying a first receiver 20 and a second leaf 22 carrying a second receiver 24. The first receiver 20 and the second receiver 24 are axially aligned in the illustrated embodiment (see FIGS. 1 and 2). As further illustrated, the second receiver 24 is acircular in cross section. More particularly, in the illustrated embodiment, the second receiver 24 is square in cross section.

With a reference back to FIG. 1, the hinge assembly 10 also includes a hinge pin 26 pivotally connecting the door 12 to the hinge bracket 16 at the first receiver 20. In addition, the hinge assembly 10 includes an actuator 28 having an output shaft 30. A retention feature 32 connects the output shaft 30 to the hinge bracket 16 at the second receiver 24. In addition, an actuator mounting feature 34 secures the actuator 28 to the door 12 via a door bracket 36.

More particularly, the actuator 28 includes a motor 38. In the embodiment illustrated in FIGS. 4A and 4B, the motor 38 is connected to the output shaft 30 by means of an offset drive feature 40 whereby the motor 38 may be offset from the output shaft 30 and the pivot axis A of the door 12 passing through the hinge pin 26. More particularly, the offset drive feature 40 may comprise a compact planetary drive system having an offset drive gear. As illustrated in FIG. 4A, the offset drive feature 40 allows the motor 38 to be cocked away from the door 12 providing additional clearance for the wiring grommet 42. The offset drive feature 40 may also allow the overall length of the hinge assembly 10 to be decreased.

In the illustrated embodiment, the actuator mounting feature 34 comprises the door bracket 36 that is fixed to the door 12, an adaptor plate 44 fixed to the end of the housing 46 of the actuator 28 by a plurality of screws 48 and a fastener 50 that secures the adaptor plate to the door bracket (see also FIG. 5).

The retention feature 32 may comprise substantially any structure configured or adapted to properly align the actuator 28, including the actuator mounting feature 34, with the door 12, the hinge bracket 16 and the door bracket 36 of the hinge assembly 10.

As illustrated in FIG. 3A, the retention feature 32 comprises a double spring-ball carried on the output shaft 30. As shown, the double spring-ball comprises a first ball 54 and a second ball 56 biased outwardly by compression spring 58 provided between the two balls. As shown, the first ball 54, the second ball 56 and the compression spring 58 are all received and held in a passageway 60 passing through the output shaft 30. As the output shaft 30 is inserted into the second receiver 24 provided in the second leaf 22 of the hinge bracket 16, the two balls 54, 56 are biased inwardly in the direction of action arrows B against the biasing force of the spring 58 to allow passage through the receiver 24. When the output shaft 30 is fully seated in the second receiver 24, the two balls 54, 56 are biased outwardly by the spring 58 in the direction of action arrows C so as to engage the second leaf 22 as illustrated in FIG. 3A and prevent the output shaft 30 from falling out of the second receiver 24 under the force of gravity pulling downward on the actuator 28 in the direction of action arrow D.

FIG. 3B illustrates an alternative embodiment of retention feature 32 including a single spring-ball 62 biased by compression spring 64 outwardly in the direction of action arrow E so as to engage the second leaf 22 of the hinge bracket 16 when the output shaft 30 is properly seated in the second receiver 24. As should be appreciated, the spring-ball 62 and the compression spring 64 are both retained in the passageway 66 in the output shaft 30.

FIG. 3C illustrates an embodiment of the retention feature 32 that is very similar to the one illustrated in FIG. 3B, incorporating a single spring-ball 62 and a compression spring 64 held in a passageway 66 in the output shaft 30. In this embodiment, when the output shaft 30 is fully seated in the second receiver 24, the spring-ball is biased into engagement with a detent 68 provided in the second leaf 22 forming the second receiver 24.

FIG. 3D illustrates an alternative embodiment wherein the retention feature 32 comprises a double spring 70 carried on the output shaft 30. More particularly, the double spring 70 projects past the distal end 72 of the output shaft 30 and includes two opposed projections 74. As the output shaft 30 is inserted in the direction of action arrow F into the second receiver 24 in the second leaf 22 of the hinge bracket 16, the opposed projections 74 are biased in the direction of action arrow G inward toward each other to allow passage through the second receiver 24. Once the output shaft 30 is fully seated in the second receiver 24, the opposed projections 74 spring back outwardly in the direction of action arrows H so as to engage the second leaf 22, as illustrated in FIG. 3D, and hold the output shaft 30 in position in the hinge bracket 16.

In the embodiment illustrated in FIG. 3E, a retention feature 32 comprises a double spring 76 carried on the hinge bracket 16 and, more particularly, the second leaf 22 of the hinge bracket. As the output shaft 30 is inserted in the direction of action arrow I into the second receiver 24, the opposed legs 78 of the double spring 76 are forced outwardly in the direction of action arrows J. Once the output shaft 30 is properly seated in the second receiver 24, the opposed projections 80 on the opposed legs 78 are aligned with and biased into the retention feature receiver 82, shown as a channel provided in the wall of the output shaft 30. The engagement of the projections 80 in the channel/retention feature receiver 82 function to hold the output shaft 30 in the second receiver 24 of the hinge bracket 16.

In the embodiment illustrated in FIG. 3F, the retention feature 32 comprises a single spring 84 carried on the second leaf 22 of the hinge bracket 16. The single spring 84 includes a single leg 86 and a single projection 80 that is biased into the retention feature receiver 90 formed in the output shaft 30 to thereby hold the output shaft in the seated position.

In the embodiment illustrated in FIG. 3G, the retention feature 32 comprises a dog ear 92 pivotally connected to the output shaft 30 by a pivot pin 94 and biased into the projecting position illustrated in FIG. 3G by the biasing spring 96. When the output shaft 30 is inserted into the second receiver 24, the cam surface 98 at the end of the dog ear 92 allows for the dog ear 92 to be pivoted in the direction of action arrow K about the pivot pin 94 so as to be fully received within the cavity 100 in the output shaft 30. Once the output shaft 30 is fully seated within the second receiver 24 formed in the second leaf 22 of the hinge bracket 16, the dog ear 92 has cleared the second leaf and the spring 96 biases the dog ear in the direction of action arrow L about the pivot pin 94 so that the dog ear is in position where the dog ear surface 102 is positioned to engage the second leaf 22 and hold the output shaft 30 in the fully seated position.

In the embodiment illustrated in FIG. 3H, the retention feature 32 comprises a spring clip retainer 104 including opposed retention fingers 106 that press against the output shaft 30 and hold the output shaft in the fully seated position within the second receiver 24 as shown. While not illustrated, the output shaft 30 may further include notches or grooves to receive the distal ends of the retention fingers 106 in order to provide a more secure connection.

Reference is now made to FIG. 5 which illustrates the new and improved method of assembling an actuator 28 in the hinge assembly 10. As illustrated in FIG. 5, that method includes the step of inserting the output shaft 30 of the actuator 28 into the second receiver 24 of a hinge bracket 16 by pushing the output shaft 30 upwardly in the direction of action arrow M until the output shaft 30 is fully seated in the second receiver. Next, the method includes the step of retaining, by the retention feature 32, the output shaft 30 in the second receiver 24. As noted above and illustrated in FIGS. 3A-3H, that retention feature 32 may assume a number of different structures that are suitable for the purpose of holding the output shaft 30 in the second receiver 24 and maintaining the actuator 28 in proper alignment with the remaining portion of the hinge assembly 10 to allow simple installation of the actuator on a pre-hung door 12. Next, the method includes the step of connecting, by the actuator mounting feature 34, the actuator 28 to the door 12.

More particularly, the method may include the step of holding the actuator 28 with a single hand during the inserting of the output shaft 30 of the actuator into the second receiver 24 of the hinge bracket 16. Further, the method may include the step of holding, by the resilient retention feature 32, a first mounting point or aperture 108 in the door bracket 36 in alignment with a second mounting point or aperture 110 in the adaptor plate 44 carried on the actuator 28.

Still further, the method may include the step of driving, by a drive tool T the fastener 50 into the first mounting actuator 108 and the second mounting actuator 110 whereby the actuator 28 is mounted to the door 12. Consistent with the above description, the method may also include the step of keying the output shaft 30 to the hinge bracket 16 by aligning the acircular cross section of the output shaft with the mating acircular opening of the second receiver 24.

Advantageously, the hinge assembly 10 and the related method allow one to hold the actuator 28 in one hand and easily insert the output shaft 30 of the actuator into the second receiver 24 of the hinge bracket 16. Once the output shaft 30 is fully inserted and seated in the second receiver 24, the retention feature 32 functions to hold the actuator 28 in position with the first mounting aperture 108 in the door bracket 36 aligned with the second mounting aperture 110 in the adaptor plate 44. The assembly technician may then use a drive tool T to insert and drive the fastener 50 through the aligned mounting apertures 108, 110 thereby completing the mounting of the actuator 28 to a pre-hung door 12. Advantageously, all of these mounting steps are achieved utilizing a single hand thereby simplifying assembly in the tight confines provided between the pre-hung door 12 and the frame 14 of the motor vehicle.

The foregoing has been presented for purposes of illustration and description. It is not intended to be exhaustive or to limit the embodiments to the precise form disclosed. Obvious modifications and variations are possible in light of the above teachings. For example, the double spring-ball retention feature 52 illustrated in FIG. 3A may be provided on the second leaf 22 of the hinge bracket 16 with cooperating detents for the spring-balls 54, 56 provided in the output shaft 30 if desired. All such modifications and variations are within the scope of the appended claims when interpreted in accordance with the breadth to which they are fairly, legally and equitably entitled.

What is claimed:

1. A hinge assembly mounting a door to a frame of a motor vehicle, comprising:
    a hinge bracket including a first receiver and a second receiver;
    a hinge pin pivotally connecting said door to said hinge bracket at said first receiver;
    an actuator having an output shaft;
    a retention feature connecting said output shaft to said hinge bracket at said second receiver; and
    an actuator mounting feature securing said actuator to said door wherein (a) said first receiver and said second receiver are axially aligned and (b) said actuator includes a motor and an offset drive feature between said motor and said output shaft whereby said motor may be offset from said output shaft.

2. The hinge assembly of claim 1, wherein said hinge bracket includes a first leaf carrying said first receiver and a second leaf carrying said second receiver.

3. The hinge assembly of claim 2, wherein said hinge bracket is fixed to said frame.

4. The hinge assembly of claim 3, wherein said actuator mounting feature includes a door bracket fixed to said door, an adapter plate fixed to said actuator and a fastener securing said adapter plate to said door bracket.

5. The hinge assembly of claim 1, wherein said retention feature is a double spring-ball carried on one of said output shaft and said hinge bracket.

6. The hinge assembly of claim 1, wherein said retention feature is a single spring-ball carried on one of said output shaft and said hinge bracket.

7. The hinge assembly of claim 1, wherein said retention feature is a double spring carried on said output shaft.

8. The hinge assembly of claim 1, wherein said retention feature is a double spring carried on said hinge bracket and a spring receiver carried on said output shaft.

9. The hinge assembly of claim 1, wherein said retention feature is a single spring carried on said hinge bracket and a spring receiver carried on said output shaft.

10. The hinge assembly of claim 1, wherein said retention feature is a spring-loaded dog ear carried on said output shaft.

11. The hinge assembly of claim 1, wherein said retention feature is a spring clip retainer carried on said hinge bracket.

12. A method of assembling an actuator in a hinge assembly that mounts a door to a frame of a motor vehicle comprising:
   inserting an output shaft of said actuator into a receiver of a hinge bracket;
   retaining, by a retention feature, said output shaft in said receiver;
   connecting, by an actuator mounting feature, said actuator to said door; and
   holding said actuator in a single hand during said inserting of said output shaft of said actuator into said receiver of said hinge bracket.

13. The method of claim 12, including holding, by said retention feature, a first mounting point in a door bracket in alignment with a second mounting point in an adapter plate carried on said actuator.

14. The method of claim 13, including driving, by a drive tool, a fastener into said first mounting point and said second mounting point whereby said actuator is mounted to said door.

15. The method of claim 14, further including keying said output shaft to said hinge bracket by aligning an acircular cross section of said output shaft with a mating acircular opening of said receiver.

16. A hinge assembly mounting a door to a frame of a motor vehicle, comprising:
   a hinge bracket including a first receiver and a second receiver, said second receiver being acircular in cross section;
   a hinge pin pivotally connecting said door to said hinge bracket at said first receiver;
   an actuator having an output shaft;
   a retention feature connecting said output shaft to said hinge bracket at said second receiver; and
   an actuator mounting feature securing said actuator to said door.

\* \* \* \* \*